US008148675B2

(12) United States Patent
Okumura et al.

(10) Patent No.: US 8,148,675 B2

(45) Date of Patent: Apr. 3, 2012

(54) COLLISION CELL FOR AN MS/MS MASS SPECTROMETER

(75) Inventors: Daisuke Okumura, Kyoto (JP); Hiroto Itoi, Kyoto (JP); Kazuo Mukaibatake, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 104 days.

(21) Appl. No.: 12/444,973

(22) PCT Filed: Aug. 24, 2007

(86) PCT No.: PCT/JP2007/000899

§ 371 (c)(1),
(2), (4) Date: Apr. 9, 2009

(87) PCT Pub. No.: WO2008/047464

PCT Pub. Date: Apr. 24, 2008

(65) Prior Publication Data

US 2010/0102217 A1 Apr. 29, 2010

(30) Foreign Application Priority Data

Oct. 19, 2006 (JP) ................................ 2006-284453

(51) Int. Cl.
*B01D 59/44* (2006.01)
*H01J 49/02* (2006.01)

(52) U.S. Cl. ....................................................... 250/281

(58) Field of Classification Search .................. 250/281, 250/282

See application file for complete search history.

(56) References Cited

U.S. PATENT DOCUMENTS

| | | | | |
|---|---|---|---|---|
| 5,248,875 | A | 9/1993 | Douglas et al. | |
| 5,521,382 | A * | 5/1996 | Tanaka et al. | 250/292 |
| 5,783,824 | A | 7/1998 | Baba et al. | |
| 5,847,386 | A | 12/1998 | Thomson et al. | |
| 6,781,117 | B1 * | 8/2004 | Willoughby et al. | 250/281 |

(Continued)

FOREIGN PATENT DOCUMENTS

EP 0 817 239 A1 1/1998

(Continued)

OTHER PUBLICATIONS

Leather et. al., 'Influence of the Length and Position of the Collision Cell on the Reolving Power Attainable from Collisionally Activated Processes in Sector Instruments', Mar. 1995, Journal of the American Society for Mass Spectrometry, vol. 6, Issue 3, p. 212-219.*

(Continued)

*Primary Examiner* — Jack Berman
*Assistant Examiner* — Eliza Osenbaugh-Stewart
(74) *Attorney, Agent, or Firm* — Sughrue Mion, PLLC

(57) ABSTRACT

The length of the collision cell (20) in the direction along the ion optical axis (C) is set to be within the range between 40 and 80 mm, and typically 51 mm, which is remarkably shorter than before. The CID gas is supplied so that it flows in the direction opposite to the ion's traveling direction. Since the energy that an ion receives in colliding with a CID gas increases, it is possible to practically and sufficiently ensure the CID efficiency even though the collision cell (20) is short. In addition, since the passage distance for an ion is short, the passage time is shortened. Accordingly, it is possible to avoid the degradation in the detection sensitivity and the generation of a ghost peak due to the delay of the ion.

2 Claims, 7 Drawing Sheets

U.S. PATENT DOCUMENTS

| | | | | |
|---|---|---|---|---|
| 2004/0222369 | A1* | 11/2004 | Makarov et al. | 250/281 |
| 2005/0116158 | A1* | 6/2005 | Krutchinsky et al. | 250/281 |
| 2008/0265154 | A1* | 10/2008 | Cousins et al. | 250/288 |

FOREIGN PATENT DOCUMENTS

| | | | |
|---|---|---|---|
| JP | 07-201304 | A | 8/1995 |
| JP | 08-124519 | A | 5/1996 |
| JP | 10-021871 | A | 1/1998 |
| JP | 11-510946 | A | 9/1999 |
| JP | 2000-149865 | A | 5/2000 |
| JP | 3379485 | | 12/2002 |
| JP | 2004-303719 | A | 10/2004 |
| WO | 97/07530 | A1 | 2/1997 |

OTHER PUBLICATIONS

Japanese Office Action dated Mar. 8, 2011 for corresponding Japanese Patent Application No. 2008-539671.

Japanese Office Action dated Jun. 28, 2011, issued in corresponding Japanese Patent Application No. 2008-539671.

* cited by examiner (a)

(b)

COLLISION CELL FOR AN MS/MS MASS SPECTROMETER

TECHNICAL FIELD

The present invention relates to an MS/MS mass spectrometer for dissociating an ion having a specific mass-to-charge ratio by a collision-induced dissociation (CID) and mass analyzing the product ion (or fragment ion) generated by this process.

BACKGROUND ART

A well-known mass-analyzing method for identifying a substance having a large molecular weight and for analyzing its structure is an MS/MS analysis (or tandem analysis). FIG. 15 is a schematic configuration diagram of a general MS/MS mass spectrometer disclosed in Patent Documents 1 through 3 or other documents.

In this MS/MS mass spectrometer, three-stage quadrupole electrodes 12, 13, and 15 each composed of four rod electrodes are provided, inside the analysis chamber 10 which is vacuum-evacuated, between an ion source 11 for ionizing a sample to be analyzed and a detector 16 for detecting an ion and providing a detection signal in accordance with the amount of ions. A voltage ±(U1+V1·cos ωt) is applied to the first-stage quadrupole electrodes 12, in which a direct current U1 and a radio-frequency voltage V1·cos ωt are synthesized. Due to the action of the electric field generated by this application, only a target ion having a specific mass-to-charge ratio m/z is selected as a precursor ion from among a variety of ions generated in the ion source 11 and passes through the first-stage quadrupole electrodes 12.

The second-stage quadrupole electrodes 13 are placed in the well-sealed collision cell 14, and Ar gas for example as a CID gas is introduced into the collision cell 14. The precursor ion sent into the second-stage quadrupole electrodes 13 from the first-stage quadrupole electrodes 12 collides with Ar gas inside the collision cell 14 and is dissociated by the collision-induced dissociation to produce a product ion. Since this dissociation has a variety of modes, two or more kinds of product ions with different mass-to-charge ratios are generally produced from one kind of precursor ion, and these product ions exit from the collision cell 14 and are introduced into the third-stage quadrupole electrodes 15. Since not every precursor ion is dissociated, some non-dissociated precursor ions may be directly sent into the third-stage quadrupole electrodes 15.

To the third-stage quadrupole electrodes 15, a voltage ±(U3+V3·cos ωt) is applied in which a direct current U3 and a radio-frequency voltage V3·cos ωt are synthesized. Due to the action of the electric field generated by this application, only a product ion having a specific mass-to-charge ratio is selected, passes through the third-stage quadrupole electrodes 15, and reaches the detector 16. The direct current U3 and radio-frequency voltage V3·cos ωt which are applied to the third-stage quadrupole electrodes 15 are appropriately changed, so that the mass-to-charge ratio of an ion capable of passing the third-stage quadrupole electrodes 15 is scanned to obtain the mass spectrum of the product ions generated by the dissociation of the target ion.

In a conventional and general MS/MS mass spectrometer, the length of the collision cell 14 in the direction along the ion optical axis C which is the central axis of the ion stream is set to be approximately 150 through 200 mm. In addition, the supply of the CID gas is controlled so that the gas pressure in the collision cell 14 is a few mTorr. However, when an ion proceeds in a radio-frequency electric field in the atmosphere of comparatively high gas pressure, the kinetic energy of the ion attenuates due to a collision with gas, so that the ion's flight speed decreases. In the collision cell 14 in the aforementioned conventional MS/MS mass spectrometer, since the decelerating area of the ion's kinetic energy is long, the delay of the ion is significant; a decelerated ion could stop in an extreme case.

In the case where an MS/MS mass spectrometer is used as a detector of a chromatograph such as a liquid chromatograph for example, it is necessary to repeatedly perform an analysis at predetermined intervals of time. Hence, if the ion's delay is significant as previously described, an ion which should normally pass through the third-stage quadrupole electrodes 15 might not be able to pass through it, which causes a degradation in the detection sensitivity. In addition, an ion remaining in the collision cell 14 may appear at a timing at which no ion should appear in reality, which causes a ghost peak. Moreover, since it takes time for an ion to reach the detector 16, the time interval of the repeated analysis is required to be previously determined in view of such a situation, which might cause an omission of analysis information in a multi-component analysis.

In order to avoid such a variety of problems as previously described, conventionally and generally, a direct current electric field is formed which has a potential gradient in the ion's passage direction in the collision cell 14, so that an ion should be accelerated by the action of the direct current electric field. However, even though such an acceleration is performed, in the conventional configuration, the time period for an ion to pass through the collision cell 14 is not negligible. In view of this, it is necessary to set the relatively low speed of the mass scan in the third-stage quadrupole electrodes 15, which is the subsequent stage, which takes time to collect the data for one mass scan. In the case where a direct current electric field having a potential gradient in the ion's passage direction is formed as previously described, the configuration of the electrodes themselves and that of the voltage application circuit are complicated compared to the case where a constant direct current electric field without a potential gradient is formed, which causes an increase in cost. Simultaneously, the configuration in which three-stage quadrupole electrodes 12, 13, and 15 are linearly arranged as previously described has a problem in downsizing the apparatus.

[Patent Document 1] Japanese Unexamined Patent Application Publication No. H07-201304
[Patent Document 2] Japanese Unexamined Patent Application Publication No. H08-124519
[Patent Document 3] U.S. Pat. No. 5,248,875

DISCLOSURE OF THE INVENTION

Problems to be Solved by the Invention

The present invention has been achieved to solve the aforementioned problems, and the main objective thereof is to provide an MS/MS mass spectrometer capable of shortening the time period for an ion to reach the detector while ensuring a high ion CID efficiency.

Another objective of the present invention is to provide an MS/MS mass spectrometer capable of shortening the time period for an ion to reach the detector with a simplified electrode configuration and that of a voltage application circuit for applying the voltage thereto in the collision cell.

Means for Solving the Problems

In a conventional MS/MS mass spectrometer as previously described, as the quadrupole electrodes provided in a collision cell, the same electrodes as the quadrupole for the mass separation have been used. Hence, the length of the collision cell has been set to be approximately 150 through 200 mm. However, given the dissociation mechanism that a dissociation occurs by a collision energy generated when an ion with a kinetic energy collides with inert gas, it is possible to presume the following: a collision takes place with high efficiency in a relatively small area of approximately a few dozen mm from the entrance of the collision cell where an ion has a relatively large kinetic energy, and in a position where an ion further proceeds, the collision of the ion, if it occurs, contributes little to the entire CID efficiency. Based on such a presumption, the collision cell does not necessarily have a long form in the ion passage direction as before, and it is possible to suppose that, even if the length is shorter than before, a dissociation occurs with sufficient efficiency.

Hence, the inventors of the present invention have experimentally investigated the relationship between the CID efficiency of a precursor ion in the collision cell and the length of the collision cell in the direction along the ion optical axis, in an MS/MS mass spectrometer with three stages: the first mass separator, collision cell, and second mass separator. Consequently, they have confirmed that with the length of 51 mm which is dramatically shorter than a conventional and general collision cell, it is possible to obtain a practically sufficient CID efficiency. Furthermore, they have performed an experiment, conducted a theoretical study based on it, and concluded that it is possible to obtain a practically sufficient CID efficiency if the length is in the range between 40 and 80 mm which is approximately less than half of the length of a conventional and general collision cell.

The present invention has been accomplished based on such knowledge, and provides an MS/MS mass spectrometer in which a first mass separation unit for selecting an ion having a specific mass-to-charge ratio as a precursor ion from among a variety of ions, a collision cell for making the precursor ion collide with a predetermined gas in order to dissociate the precursor ion by a collision-induced dissociation, and a second mass separation unit for selecting an ion having a specific mass-to-charge ratio from among a variety of product ions generated by the dissociation of the precursor ion, are linearly disposed, wherein the length of the collision cell in the direction along an ion optical axis is determined to be in the range between 40 and 80 mm.

In one embodiment of the MS/MS mass spectrometer according to the present invention, the length of the collision cell along the ion optical axis may be determined to be 51 mm.

Effects of the Invention

In the MS/MS mass spectrometer according to the present invention, the length of the collision cell is less than approximately half compared to before, i.e. dramatically short. Therefore, the time period required for an ion to pass through the collision cell (to be more exact, the time period between the injection of a precursor ion and the exit of a product ion generated by the collision of the precursor ion) is fairly shortened. On the other hand, the length of the area required for a precursor ion to be sufficiently dissociated can be ensured inside the collision cell.

Therefore, the MS/MS mass spectrometer according to the present invention can achieve an unprecedentedly short flight time for an ion originating from an ion generated in an ion source, i.e. a product ion having a specific mass-to-charge ratio, to reach the detector, while maintaining a practically sufficient CID efficiency. Accordingly, for example, the mass scan rate in the second mass separator which is the subsequent stage may be increased and the time interval for a repeated analysis task may be shortened to densely perform an analysis. Consequently, the overlooking of a component can be reduced. In addition, since the ions which should be made to pass through the second mass separator reach the second mass separator without a large temporal variation, the ions' passage efficiency in the second mass separator is increased, which improves the detection sensitivity.

What is more, since it is also possible to prevent an undesired ion from remaining in the collision cell, the generation of a ghost peak on the mass spectrum is also avoided. Furthermore, since the ion's passage time can be shortened without forming a direct current electric field having a potential gradient in the ion's passage direction inside the collision cell, the configuration of the electrodes provided in the collision cell can be simplified and the voltage application circuit for the electrodes can also be simplified. Accordingly, it is advantageous in decreasing the apparatus' cost. In addition, the shortness of the collision cell is advantageous in downsizing the entire apparatus.

In the MS/MS mass spectrometer according to the present invention, the flow of the predetermined gas inside the collision cell may preferably be formed in the counter direction of the traveling direction of an ion.

With this configuration, it is possible to increase the energy that a precursor ion receives when the predetermined gas collides with the precursor ion injected into the collision cell. Hence, a high CID efficiency can be achieved with a relatively low gas pressure. Accordingly, the evacuation capacity of the vacuum pump for vacuum-evacuating the analysis chamber requires minimal enhancement, which is advantageous to the cost.

EXPLANATION OF NUMERALS

10 . . . Analysis Chamber
11 . . . Ion Source
12 . . . First-Stage Quadrupole Electrodes
15 . . . Third-Stage Quadrupole Electrodes
16 . . . Detector
20 . . . Collision Cell
21 . . . Ion Injection Aperture
22 . . . Ion Exit Aperture
23 . . . Octapole Electrodes
231 . . . Rod Electrode
24 . . . Supply Pipe
24*a* . . . Gas Ejection Port
30 . . . CID Gas Supplier
32, 33, 34 . . . RF+DC Voltage Generator
C . . . Ion Optical Path

BEST MODES FOR CARRYING OUT THE INVENTION

First Embodiment

Figure 1:
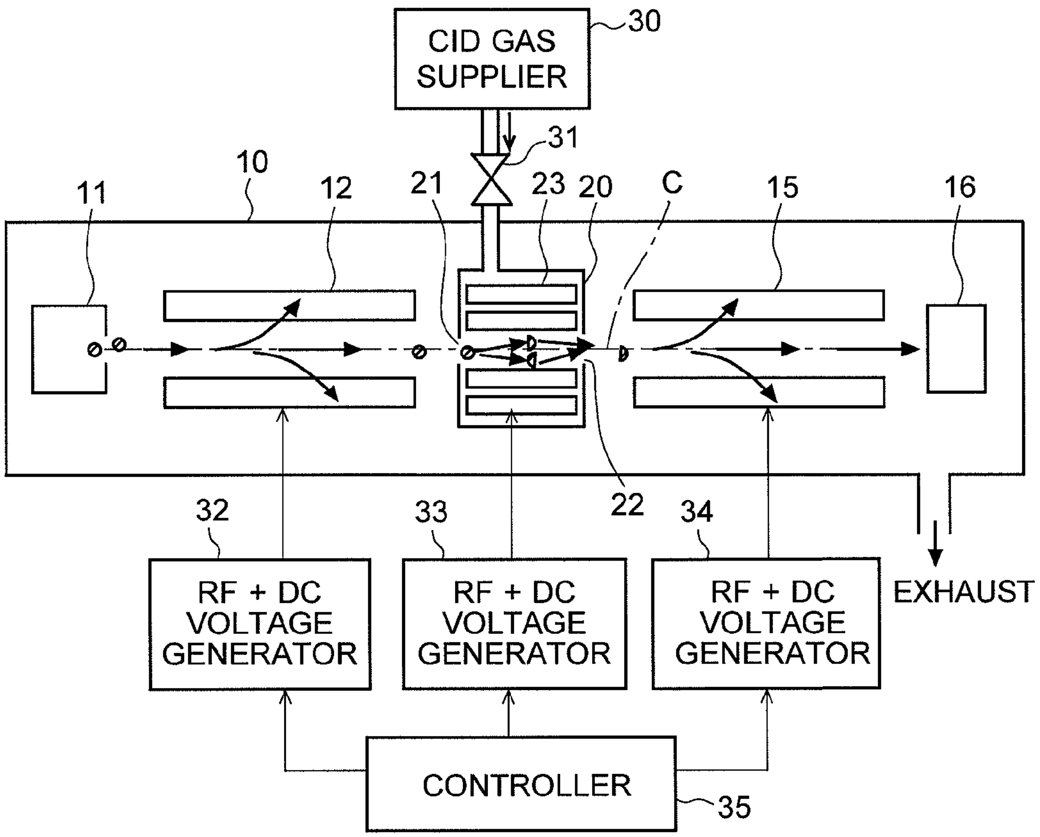
FIG. 1 is an overall configuration diagram of an MS/MS mass spectrometer according to one embodiment (the first embodiment) of the present invention.
Figure 2:
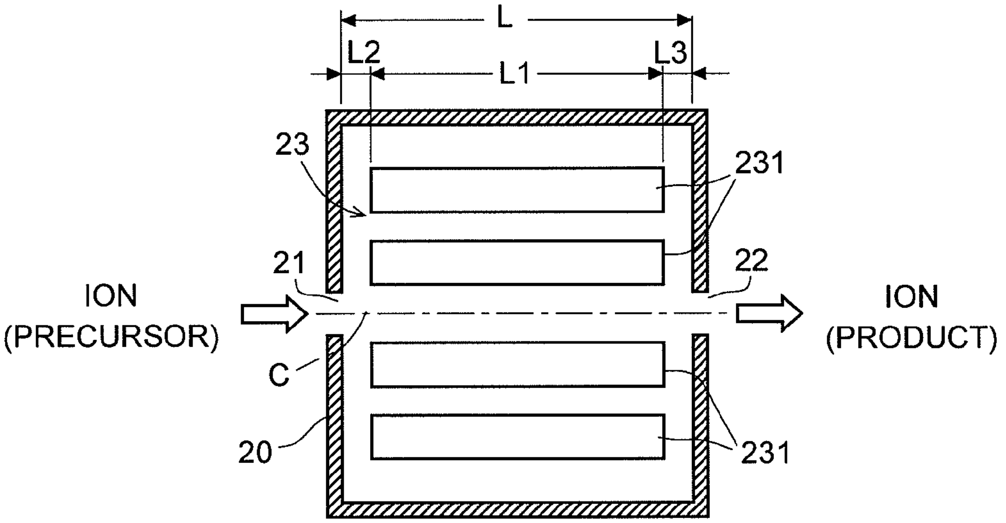
FIG. 2 is a detailed sectional view of a collision cell in the MS/MS mass spectrometer of the first embodiment.
Figure 15:
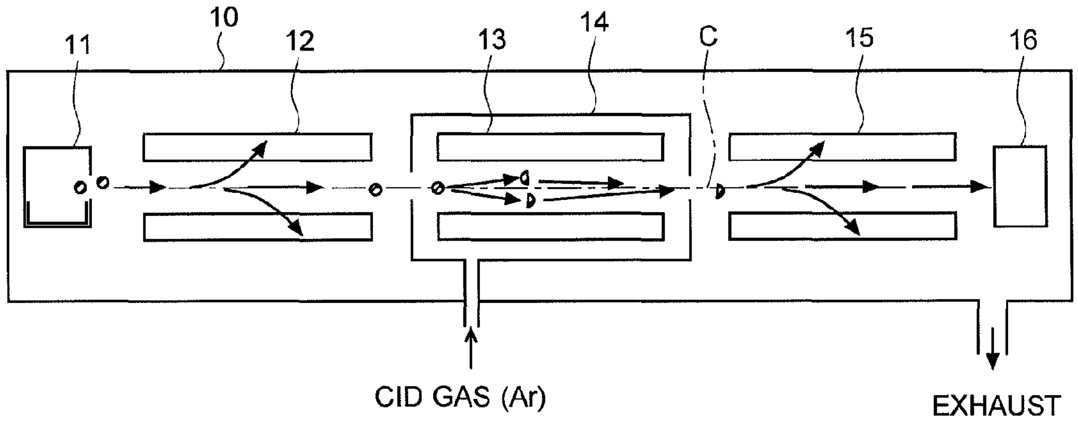
PRIOR ART Fig. 15
FIG. 15 is an overall configuration diagram of a conventional MS/MS mass spectrometer.

An MS/MS mass spectrometer which is an embodiment (or the first embodiment) of the present invention will be described with reference to the figures. FIG. 1 is an overall configuration diagram of the MS/MS mass spectrometer according to the first embodiment, and FIG. 2 is a detailed sectional view of a collision cell in the MS/MS mass spectrometer of the first embodiment. The same components as in the conventional configuration as illustrated in FIG. 15 are indicated with the same numerals and the detailed explanations are omitted.

In the MS/MS mass spectrometer of the first embodiment, as in a conventional configuration, a collision cell 20 is provided between the first-stage quadrupole electrodes 12 (which correspond to the first mass separator in the present invention) and the third-stage quadrupole electrodes 15 (which correspond to the second mass separator in the present invention) in order to generate a variety of product ions by dissociating a precursor ion. This collision cell 20, as illustrated in FIG. 2, is an almost hermetically-closed structure except for an ion injection aperture 21 and ion exit aperture 22. Inside the collision cell 20, octapole electrodes 23 are provided in which eight cylindrically-shaped rod electrodes 231 are placed to surround an ion optical axis C. Conventionally, the length of the collision cell 20 in the direction along the ion optical axis C has been 150 through 200 mm; on the other hand, in the apparatus of the present embodiment, the length L of the internal space of the collision cell 20 (i.e. the distance between the inner wall surface in which the ion injection aperture 21 is located and the inner wall surface in which the ion exit aperture 22 is located) is set to be 51 mm, the length L1 of the rod electrode 231 of the octapole electrodes 23 is set to be 50 mm, and each of the lengths L2 and L3 between the end face of the rod electrode 231 and the inner wall of the collision cell 20 is set to be 0.5 mm. Thus, compared to before, the collision cell 20 is fairly short.

To the first-stage quadrupole electrodes 12, the first RF (radio frequency)+DC (direct current) voltage generator 32 applies a voltage ±(U1+V1·cos ωt) in which a direct current voltage U1 and a radio-frequency voltage V1·cos ωt are synthesized or a voltage ±(U1+V1·cos ωt)+Vbias1 in which a predetermined direct current bias voltage Vbias1 is further added. To the third-stage quadrupole electrodes 15, the third RF+DC voltage generator 34 applies a voltage ±(U3+V3·cos ωt) in which a direct current voltage U3 and a radio-frequency voltage V3·cos ωt are synthesized, or a voltage ±(U3+V3·cos ωt)+Vbias3 in which a predetermined direct current bias voltage Vbias3 is further added. These voltage settings are performed in the same manner as before. For the eight rod electrodes 231 which constitute the octapole electrodes 23, four alternate electrodes in the circumferential direction centering on the ion optical axis C are considered to be a single group. For the two groups of electrodes, the second RF+DC voltage generator 33 applies a voltage U2+V2·cos ωt to one group, in which a direct current bias voltage U2 and a radio-frequency voltage V2·cos ωt are synthesized. The second RF+DC voltage generator 33 also applies a voltage U2−V2·cos ωt to the other group, in which the applied voltage is obtained by synthesizing the direct current bias voltage U2 and a radio-frequency voltage −V2·cos ωt which has a reversed polarity to the radio-frequency voltage V2·cos ωt.

A CID gas such as Ar gas is supplied into the collision cell 20 from the CID gas supplier 30 through the valve 31. Accordingly, the gas pressure in the collision cell 20 is maintained at a virtually constant level higher than the pressure in the external analysis chamber 10. The former gas pressure level may be approximately a few mTorr for example, which roughly equals the gas pressure in a conventional collision cell; however, the gas pressure may be increased in order to enhance the CID efficiency.

Figure 3:
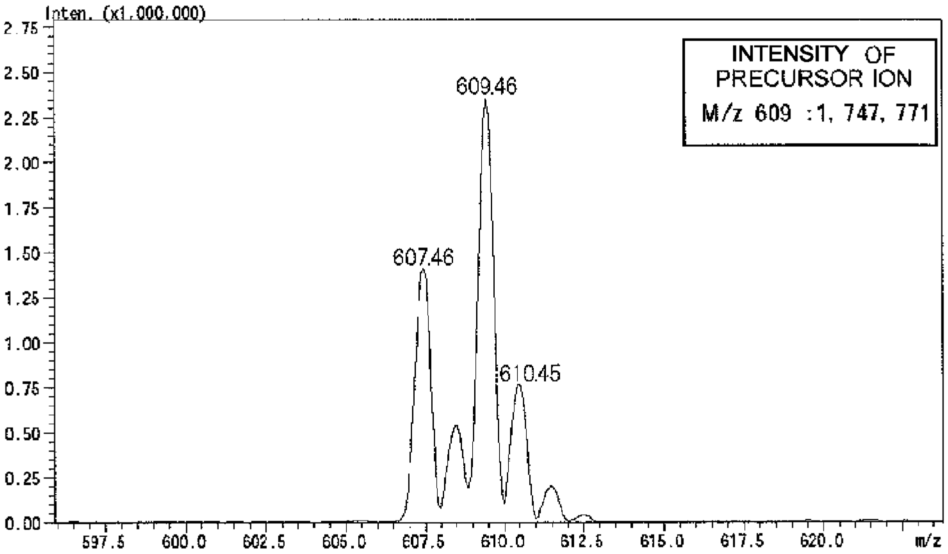
FIG. 3 is a diagram illustrating mass spectra obtained by an actual measurement.
Figure 3:
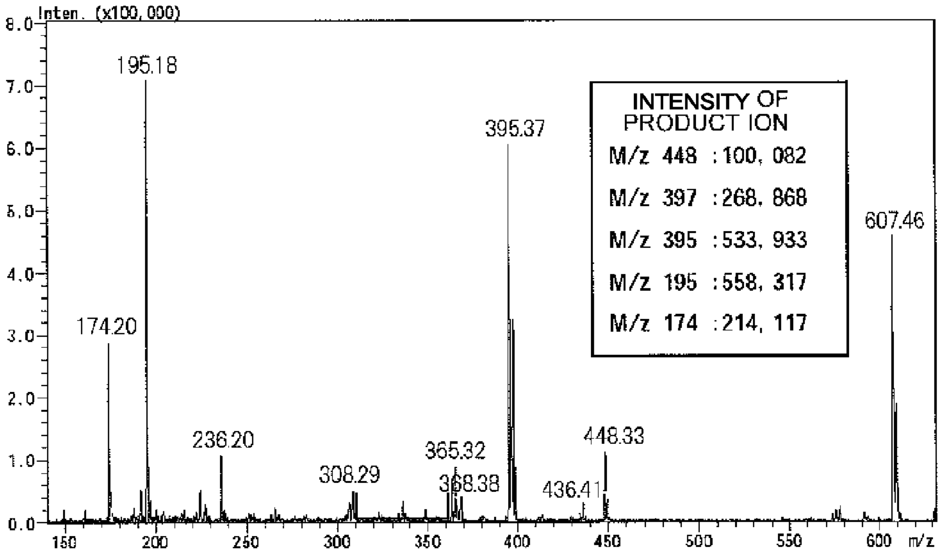

In the MS/MS mass spectrometer having the aforementioned configuration, even though the space in the collision cell 20 in the ion passage direction, i.e. the space for an ion injected through the ion injection aperture 21 to collide with the CID gas, is shorter than before, a practically sufficient CID efficiency can be obtained. The result of an experimental confirmation of this respect will be explained. FIG. 3 illustrates mass spectra obtained by an actual measurement: (a) is a mass spectrum in the case where the precursor ion's selection and the precursor ion's dissociation were not performed, and (b) is a mass spectrum in the case where an ion having a mass-to-charge ratio of 609 was selected as a precursor ion and then a dissociation was performed. That is, (b) is a mass spectrum of the product ions. The size of the collision cell 20 and octapole electrodes 23 was as previously described. The gas pressure was 3 mTorr, and the collision energy was 40 eV.

At this point in time, supposing that all the product ions appearing on the mass spectrum of FIG. 3(*b*) have originated from the precursor ion having a mass-to-charge ratio of 609, the CID efficiency P should be as follows:

$$P=\text{(the sum of the product ions' intensities)/(the precursor ion's intensity)}=1675317/1747771\times 100=95.8[\%]$$

The sum of the product ions' intensities used in this computation might be calculated including a product ion originating from a mass-to-charge ratio of 607, which is not the target mass-to-charge ratio of 609. However, even if this is taken into consideration and a recalculation is performed, the CID efficiency exceeds 60%, which is a sufficiently practical level.

Although the reason why a sufficient CID efficiency can be ensured with a shorter collision cell than before has not been clearly ascertained, it can be speculated as follows, in view of the mechanism of the dissociation by a CID: that is, in a conventional and general collision cell, quadrupole electrodes for the mass separation in the previous stage or subsequent stage of the collision cell are often used as an electrode to be provided inside the collision cell. Therefore, the length of the collision cell is determined in accordance with the length of the quadrupole electrodes, and even in the case where such quadrupole electrodes are not used as an electrode, the length of the collision cell is not significantly changed. However, deducing from the mechanism of dissociation that a precursor ion which has entered a collision cell collides with a CID gas and the precursor ion's bond is cut by the collision energy, it is thought that a dissociation is likely to occur at the location close to the ion injection aperture of the collision cell, where a precursor ion has a relatively large kinetic energy. In other words, if the collision cell is long in the ion's passage direction, it is relatively unlikely that a dissociation occurs in the deep area (or location) where an ion has much progressed. Accordingly, it is highly possible that any collision cell will exhibit an appreciable CID efficiency if its length in the ion's passage direction exceeds a certain length and yet an increase in the length of the collision cell beyond this certain length will produce only a relatively small improvement in the CID efficiency.

On the other hand, with a short collision cell, the time period for an ion to pass through the collision cell is assuredly shortened that much. Accordingly, it is possible to shorten the time period required for an ion to depart from the ion source 11 and reach the detector 16 more than before. In addition, since the decrease of the ion's speed in the collision cell 20 is restrained, the sensitivity degradation due to the delay of an ion passing through the collision cell 20 can also be reduced. Furthermore, it is possible to prevent the generation of a ghost peak due to the retention of an ion.

In the foregoing explanation, the length of the collision cell 20 was set to be 51 mm based on the result of an experiment. The inventors of the present invention have performed some experiments and conducted a study based on these experiments in order to determine a practically appropriate range for the length of the collision cell 20. Hereinafter, the content and result of those experiments will be explained.

First, with the same arrangement as illustrated in FIGS. 1 and 2, the length of the collision cell 20 (or the length L of the internal space) was set to be 80 mm, the length L1 of the rod electrode 231 of the octapole electrodes 23 was set to be 79 mm, the CID gas pressure was set to be 10 mTorr, and the collision energy was set to be 30 eV. Then, the conditions were set so that papaverine (molecular formula: $C_{20}H_{21}NO_4$) with a mass-to-charge ratio of 340 should be selected as a precursor ion by the first-stage quadrupole electrodes 12, introduced into the collision cell 20 to be dissociated, and after that, a product ion having a mass-to-charge ratio of 202 should be selected in the third-stage quadrupole electrodes 15 to be detected by the detector 16. If the precursor ions are continuously injected into the collision cell 20 and the injection is halted at a certain point in time, in connection with this operation, the generation of the product ion in the collision cell 20 is also halted. However, if the delay of the precursor ion in the collision cell 20 is large, product ions originating from the precursor ion are continued to be generated after the halt of the precursor ion's injection, and the product ions should be detected.

Figure 13:
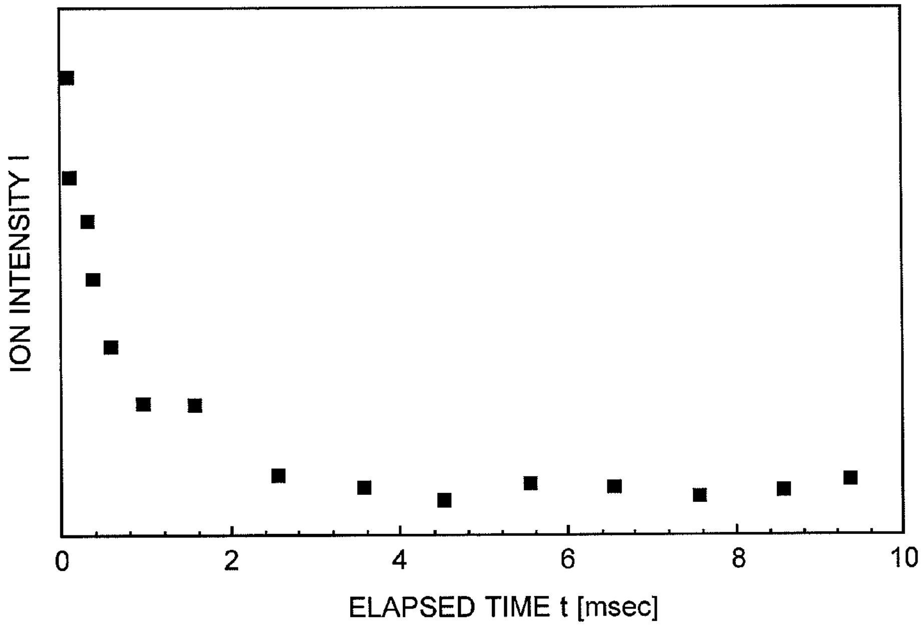
FIG. 13 is a diagram illustrating the result of an actual measurement for determining the relationship between the elapsed time from the point in time when the injection of a precursor ion into the collision cell is halted and the product ion's signal intensity.

Given these factors, the relationship between the elapsed time t from the point in time when the injection of a precursor ion into the collision cell 20 is halted and the signal intensity I of the product ion having a mass-to-charge ratio of 202 was actually measured. The result is illustrated in FIG. 13. This result shows that after the injection of a precursor ion into the collision cell 20 is halted, product ions continuously exit from the collision cell 20, and the exit of the product ions virtually finishes within approximately 4 msecs. The elapsed time t used in this measurement includes the time required for an ion which has exited from the collision cell 20 to pass through the third-stage quadrupole electrodes 15 and reach the detector 16. However, this time period is so short compared to the delay time in the collision cell 20 that it can be ignored. The time period for the product ions to finish exiting from the collision cell 20 should preferably be as short as possible because shortening this time period reduces the delay of the precursor ion. However, there is almost no problems from practical viewpoints if the time period for the finish of the exit is within 5 msecs. Consequently, the result obtained from the experiment is within an allowance from the viewpoint of shortening the delay of a precursor ion.

Figure 14:
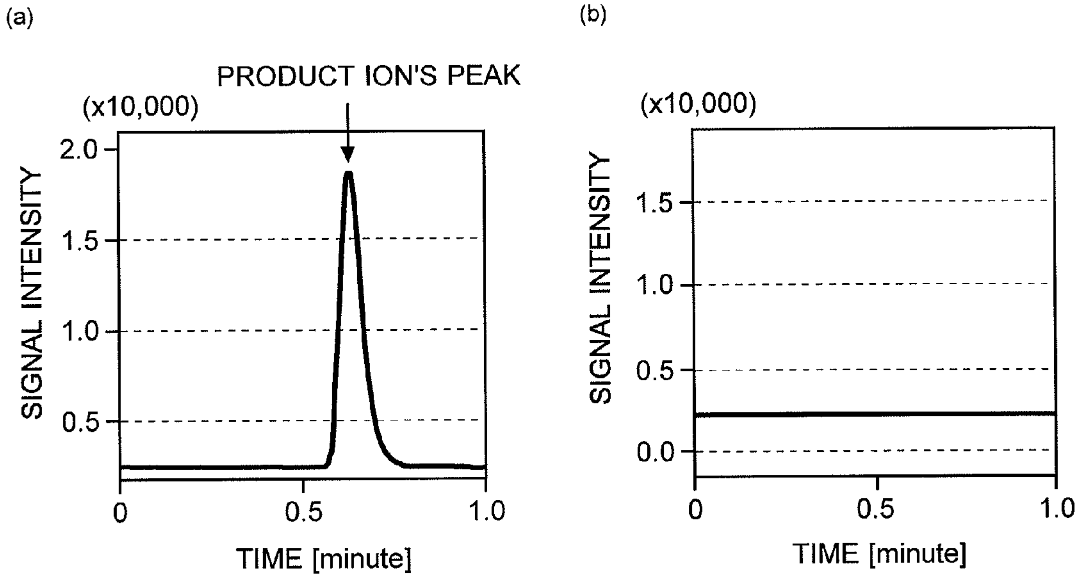
FIG. 14 is a diagram illustrating mass chromatograms which are the result of research on the delay of a precursor ion in the collision cell.

FIG. 14 illustrates the diagrams of an actual measurement under the same condition as previously described. FIG. 14(*a*) is a state in which a peak of the mass chromatogram of a mass-to-charge ratio of 202 is observed at the point in time when 6.5 msecs have elapsed from the point in time when the injection of a precursor ion into the collision cell 20 has been initiated. FIG. 14(*b*) is a state in which a peak of the mass chromatogram of a mass-to-charge ratio of 202 is observed at the point in time when 6.5 msecs have elapsed from the point in time when the injection of the precursor ion into the collision cell 20 has been halted. In FIG. 14(*b*), the product ion's peak is barely seen and the peak relative intensity is approximately 0.01% compared to FIG. 14(*a*). Therefore, it is possible to judge that no product ion remained in the collision cell 20. That is, also from this result, it is known that the exiting of a product ion from the collision cell 20 was finished at the point in time when 6.5 msecs elapsed from the point in time when the injection of the precursor ion into the collision cell 20 was halted.

From the previously described results, it is known that in the case where the length of the collision cell 20 (i.e. the length L of the inner space) is set to be 80 mm, ions generated by a dissociation are discharged from the collision cell 20 within a significantly short period of time without accelerating the ion by a direct current electric field in the collision cell 20. The CID efficiency of papaverine under the aforementioned conditions is approximately 80%, which is the level free from any problem in view of the CID efficiency. Accordingly, the length of the collision cell 20 can be 80 mm. However, if the collision cell 20 is lengthened more than this length, it is expected that it takes more than 5 msecs for product ions to finish exiting from the collision cell 20. Therefore, it can be thought that this is the upper limit of the length of the collision cell 20.

On the other hand, in the case where the length of the collision cell 20 is short, although there is no problem of the ion's delay as previously described as a matter of course, it is thought that the CID efficiency is decreased due to the shortened area for a precursor ion to dissociate. Accordingly, the lower limit of the length of the collision cell 20 can be decided mainly by the CID efficiency. The CID efficiency depends on the length of the collision cell 20, and significantly depends on the degree of vacuum (or CID gas pressure) in the collision cell 20, or other factors. Therefore, even if the CID efficiency is decreased by shortening the collision cell 20, the decrease of the CID efficiency can be compensated by increasing the CID gas pressure. However, the degree of vacuum in the analysis chamber 10 is required to be maintained at a constant level. To this end, if the supply amount of the CID gas is increased in order to increase the CID gas pressure, the vacuum evacuation capacity is also required to be increased. If a vacuum pump with higher capacity is required to be used, there is a considerable increase in cost. According to an experiment by the inventors of this patent application, the effect of the improvement of the CID efficiency, i.e. the sensitivity, due to the increase of the CID gas pressure without a large cost burden can be anticipated to be approximately 15%. In addition, since the ion's transmission efficiency is dependent on the mass-to-charge ratio, the CID efficiency also depends on the mass-to-charge ratio, i.e. the sample to be analyzed. For example, it is confirmed that the CID efficiency of erythromycin, which is a macrolide antibiotic, is approximately 40% higher than that of papaverine. Since papaverine is a substance whose transmission efficiency is relatively low, a substance having a better transmission efficiency than this can be supposed to be a standard substance to be analyzed. Accordingly, with the improvement effect by the previously described increase of the CID gas pressure, it is possible to anticipate that the CID efficiency will be improved approximately by 20%, compared to the experimental result using papaverine.

Generally, the CID efficiency P agrees in theory with the following computational formula:

$$P[\%]=1-\exp(-A\cdot X)\times 100$$

where, X is the length of the collision cell, and A is a constant determined by the factor such as the CID gas pressure, other than the length of the collision cell. In this embodiment, the constant A is calculated based on the experimental result that the CID efficiency is 80% in the case where the length of the collision cell 20 is 80 mm, and this A is substituted into the aforementioned formula to create the CID efficiency's derivation formula. In addition, the derivation formula is corrected in prospect of the improvement effect of the CID efficiency due to the increase of the CID gas pressure and the difference of the kind of sample as previously described. According to this corrected formula, the CID efficiency is approximately 70% in the case where the length of the collision cell 20 is 43 mm, and the CID efficiency is approximately 66% in the case where the length is 40 mm. Although how much CID efficiency is practically required differs depending on the purpose of the analysis or other factors, it is thought that, roughly speaking, more than approximately 65% is required. Given such factors, the length of the collision cell 20 is preferably more than approximately 40 mm in view of the CID efficiency.

According to the experiments and the study based on their results as just described, it can be thought that the preferable range of the length of the collision cell 20 is approximately from 40 to 80 mm. The length of 51 mm, which has been described earlier, can be thought to be approximately the optimum value considering the balance between the precursor ion's delay and CID efficiency.

As described earlier, in the MS/MS mass spectrometer according to the first embodiment, compared to before, the length of the collision cell is dramatically short. Consequently, it is possible to ensure the practically sufficient CID efficiency while shortening the time period for an ion to reach the detector.

Second Embodiment

An MS/MS mass spectrometer which is another embodiment (or the second embodiment) of the present invention will be described with reference to the figures. The spectrometer in the second embodiment is almost the same as that in the first embodiment and only a portion of the collision cell's configuration is different. This configuration will be described with reference to FIG. 4.

Figure 4:
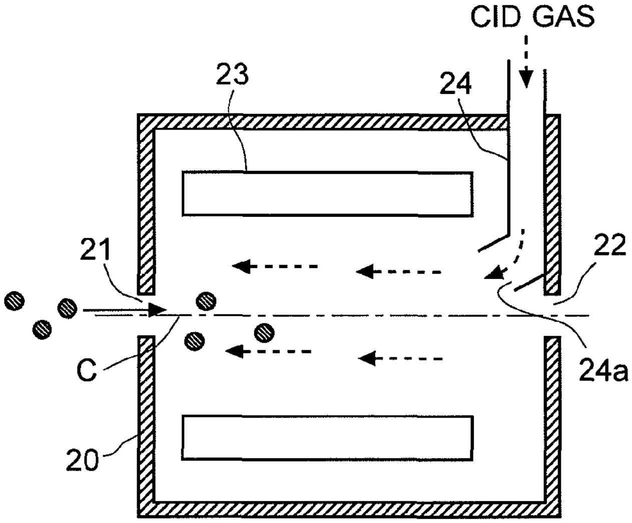
FIG. 4 is a detailed sectional view of a collision cell in the MS/MS mass spectrometer of another embodiment (the second embodiment) of the present invention.

As illustrated in FIG. 4, in the collision cell 20 in this embodiment, the gas ejection port 24*a* of the supply pipe 24 for supplying the CID gas is curved in the anterior direction. Accordingly, the CID gas spouted into the collision cell 20 from the gas ejection port 24*a* proceeds in the opposite direction of the ion's traveling direction, as indicated by the dashed arrows in the figure. Therefore, compared to the configuration of the first embodiment, ions introduced into the collision cell 20 collide with a CID gas having a larger energy, which enhances the efficiency of the dissociation. Hence, this configuration is advantageous in maintaining the CID efficiency even though the length of the collision cell 20 in the ion's passage direction is shorter than before.

Modification Example

The configuration of the electrode for forming a radio-frequency electric field disposed in the collision cell 20 is not limited to the octapole electrodes as in the aforementioned embodiments, but can be modified in a variety of ways including various types of conventionally known configurations. Concretely speaking, multipole electrodes may be used such as quadrupole electrodes and hexapole electrodes, other than octapole electrodes. With such a simple multipole configuration, a constant direct current electric field is formed in the direction of the ion optical axis C. Since the collision cell is short, it is possible to make an ion pass through the collision cell in a short period of time even with a constant direct current electric field.

Figure 9:
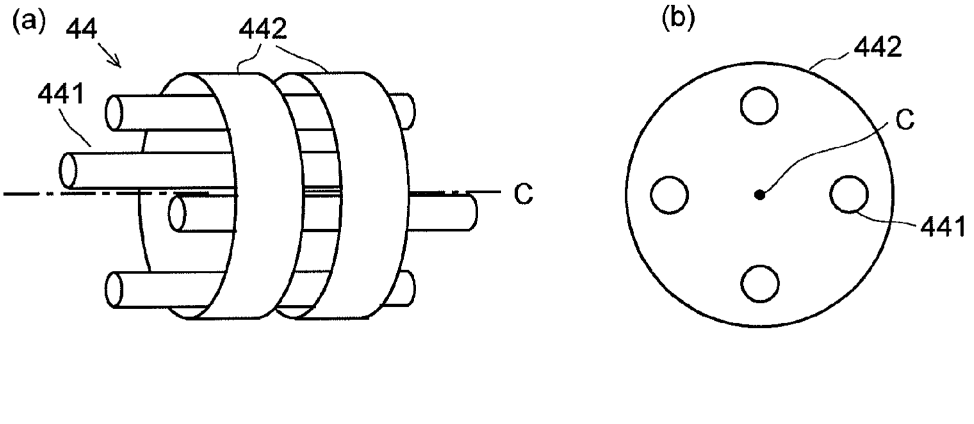
FIG. 9 is a diagram illustrating another embodiment of the electrodes used for the collision cell.
Figure 10:
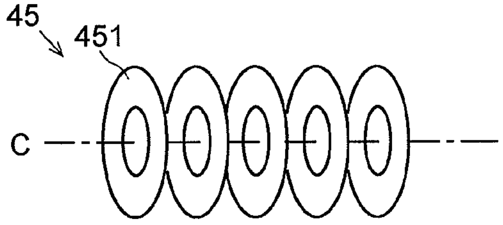
FIG. 10 is a diagram illustrating another embodiment of the electrodes used for the collision cell.
Figure 11:
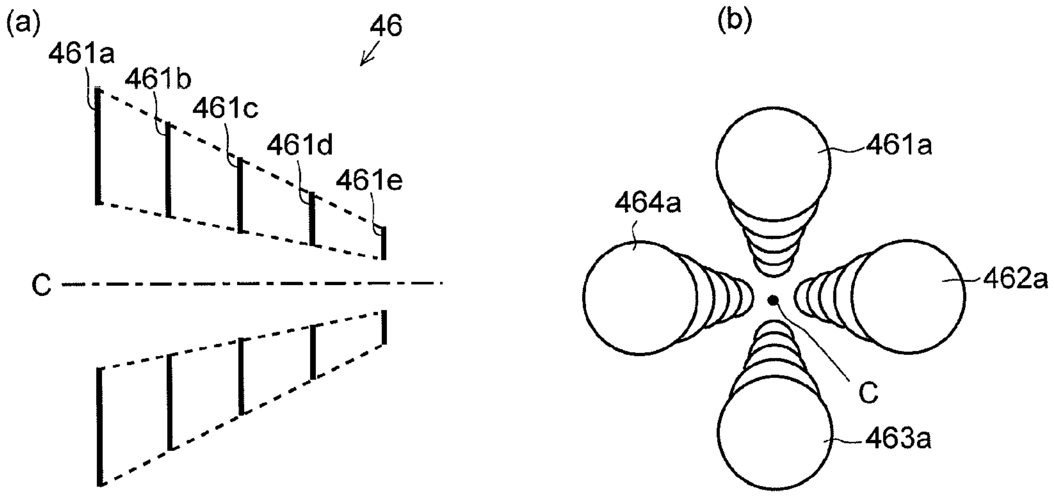
FIG. 11 is a diagram illustrating another embodiment of the electrodes used for the collision cell.

Electrodes having a different configuration as illustrated in FIGS. 5 through 12 may be used. With each of these modifications, a direct current having a potential gradient in the direction along the ion optical axis C is formed and thereby an ion can be accelerated. The configurations of FIGS. 6 through 10 are disclosed in U.S. Pat. No. 5,847,386 and other documents, and the configuration of FIG. 11 is disclosed in Japanese Patent No. 3379485 and other documents.

Figure 5:
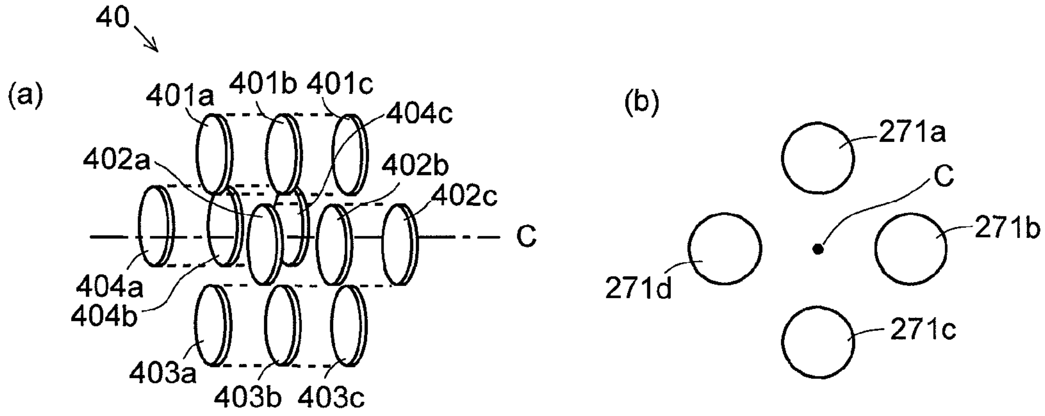
FIG. 5 is a diagram illustrating another embodiment of the electrodes used for the collision cell.

The electrodes 40 illustrated in FIG. 5 are an example in which disk electrodes are used in place of four rod electrodes of quadrupole electrodes. Instead of each rod electrode, a plurality (three in this example) of disk electrodes (e.g. 401*a*, 401*b*, and 401*c*) are disposed at predetermined intervals along the ion optical axis C. Although the three disk electrodes can be regarded as one rod electrode to apply a voltage, different direct current voltages may be respectively applied in the direction along the ion optical axis C in order to form a direct current electric field for accelerating an ion.

Figure 6:
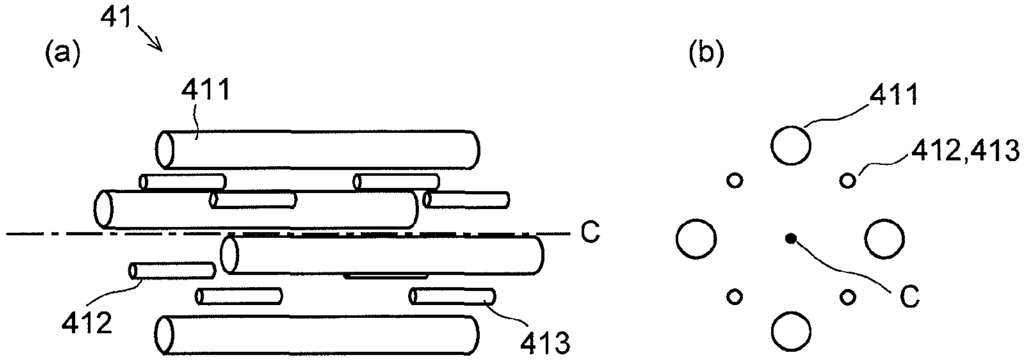
FIG. 6 is a diagram illustrating another embodiment of the electrodes used for the collision cell.

The electrodes 41 illustrated in FIG. 6 are composed of main quadrupole electrodes 411 and two groups of auxiliary quadrupole electrodes 412 and 413. Each group of the auxiliary quadrupole electrodes is composed of four auxiliary rod electrodes, and one group is placed on the entrance side of the main quadrupole electrodes 411 and the other group on the exit side. With this configuration, it is possible to form an electric field for accelerating an ion by appropriately setting each direct current voltage to be applied to the auxiliary quadrupole electrodes 412 and 413.

Figure 7:
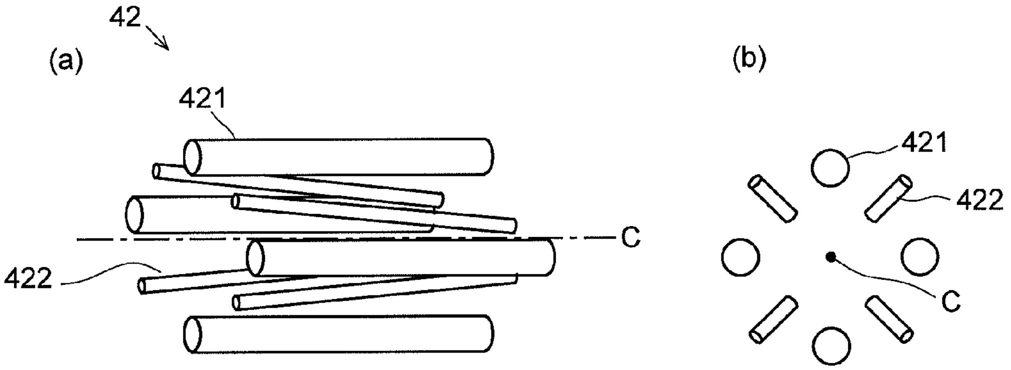
FIG. 7 is a diagram illustrating another embodiment of the electrodes used for the collision cell.

The electrodes 42 illustrated in FIG. 7 are composed of main quadrupole electrodes 421 and auxiliary quadrupole electrodes 422. The auxiliary quadrupole electrodes 422 are composed of a group of four auxiliary rod electrodes, which are not parallel to the ion optical path C but are inclined in the ion's passage direction. With this configuration, by applying a certain direct current voltage to the auxiliary quadrupole electrodes 422, an electric field for accelerating an ion can be formed in the vicinity of the ion optical path C.

Figure 8:
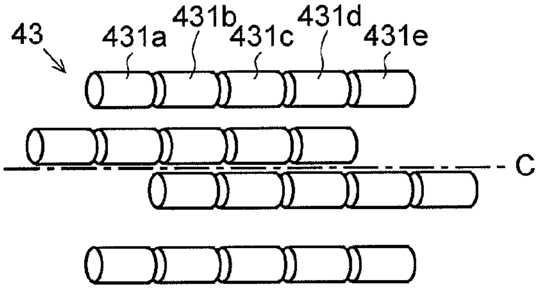
FIG. 8 is a diagram illustrating another embodiment of the electrodes used for the collision cell.

In the electrodes 43 illustrated in FIG. 8, each of the rod electrodes composing quadrupole electrodes are divided into a plurality of short rod electrodes (e.g. 431*a* through 431*e*) in the direction along the ion optical path C, and the short rod electrodes are lined up with small gaps in between.

The electrodes 44 illustrated in FIG. 9 are composed of quadrupole electrodes 441 and two-stage cylindrical electrodes 442 surrounding the quadrupole electrodes 441. By appropriately setting each of the direct current voltages applied to the two electrodes 442, an electric field for accelerating an ion can be formed.

The electrodes 45 illustrated in FIG. 10 are composed of a plurality of annular electrodes 451 arranged along the ion optical path C. The electrodes 46 illustrated in FIG. 11 are composed of plural (five in this example) disk electrode plates (e.g. 461*a* through 461*e*) whose diameter is sequentially decreased along the ion optical path C. The electrodes are arranged in such a manner that they gradually get close to the ion optical path C.

Figure 12:
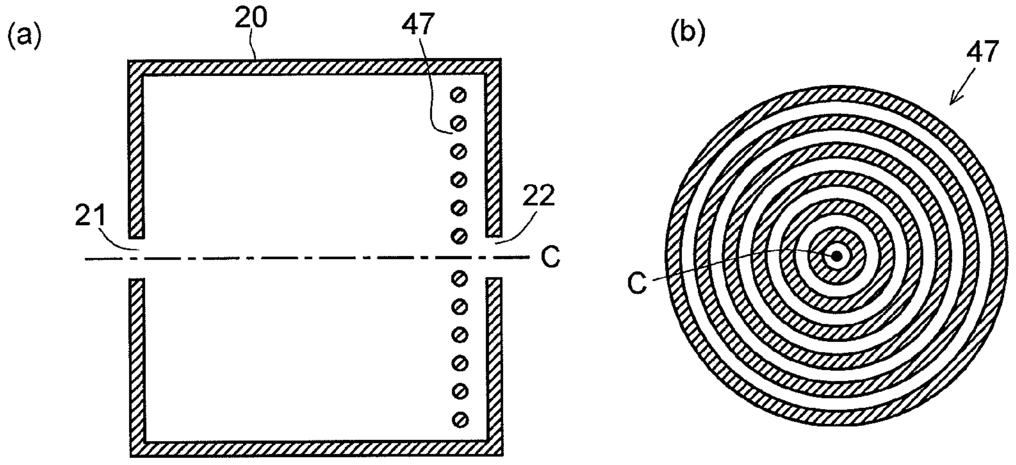
FIG. 12 is a diagram illustrating another embodiment of the electrodes used for the collision cell.

In addition, the electrodes 47 illustrated in FIG. 12 are composed of annular electrodes having concentrically different diameters, which are arranged in a plane orthogonal to the ion optical axis C. And the electrodes are placed close to the ion exit aperture 22 in the collision cell 20. To the radially-adjacent electrodes, a radio-frequency voltage with a reversed polarity is applied, and a direct current bias voltage for forming a direct current electric field is applied to each electrode so that an ion moves from the circumference toward the center.

It should be noted that every embodiment and modification described thus far is an example of the present invention, and therefore any modification, adjustment, or addition other than the aforementioned description appropriately made within the spirit of the present invention is also covered by the claims of the present patent application.

The invention claimed is:

1. An MS/MS mass spectrometer in which a first mass separation unit for selecting an ion having a specific mass-to-charge ratio as a precursor ion from among a variety of ions, a collision cell for making the precursor ion collide with a predetermined gas in order to dissociate the precursor ion by a collision-induced dissociation (CID), and a second mass separation unit for selecting an ion having a specific mass-to-charge ratio from among a variety of product ions generated by a dissociation of the precursor ion, are linearly disposed, wherein a length of the collision cell in a direction along an ion optical axis is determined to be in a range between 40 and 80 mm;

wherein a flow of predetermined gas inside the collision cell is formed in a counter direction of a traveling direction of an ion; and the collision cell includes a supply pipe for supplying the CID gas including a gas ejection port that is curved in the anterior direction.

2. The MS/MS mass spectrometer according to claim 1, wherein the length of the collision cell in the direction along the ion optical axis is determined to be 51 mm.

* * * * *